(12) United States Patent
Lin

(10) Patent No.: US 9,130,472 B2
(45) Date of Patent: Sep. 8, 2015

(54) HIGH EFFICIENT SINGLE SWITCH SINGLE STAGE POWER FACTOR CORRECTION POWER SUPPLY

(71) Applicant: Fuxiang Lin, Lidcombe (AU)

(72) Inventor: Fuxiang Lin, Lidcombe (AU)

(73) Assignee: Fuxiang Lin, Lidcombe (AU)

( * ) Notice: Subject to any disclaimer, the term of this patent is extended or adjusted under 35 U.S.C. 154(b) by 147 days.

(21) Appl. No.: 14/014,458

(22) Filed: Aug. 30, 2013

(65) Prior Publication Data

US 2014/0071716 A1    Mar. 13, 2014

(30) Foreign Application Priority Data

Sep. 10, 2012  (AU) ................................ 2012216637

(51) Int. Cl.
    H02M 1/42      (2007.01)

(52) U.S. Cl.
    CPC ............. H02M 1/42 (2013.01); H02M 1/4258 (2013.01); Y02B 70/126 (2013.01)

(58) Field of Classification Search
    CPC .......................... H02M 1/42; H02M 1/4258
    USPC ................. 363/21.01, 89, 56, 21–22
    See application file for complete search history.

(56) References Cited

U.S. PATENT DOCUMENTS

| 4,196,387 | A  | * | 4/1980  | Watabe et al. ............... 324/107 |
| 5,786,990 | A  | * | 7/1998  | Marrero ......................... 363/16 |
| 6,307,761 | B1 | * | 10/2001 | Nakagawa ...................... 363/65 |
| 6,434,021 | B1 | * | 8/2002  | Collmeyer et al. ......... 363/21.01 |
| 7,149,097 | B1 | * | 12/2006 | Shteynberg et al. ............ 363/16 |
| 8,040,114 | B2 | * | 10/2011 | Saint-Pierre .................. 323/222 |
| 8,077,481 | B2 | * | 12/2011 | Hua et al. ...................... 363/15 |
| 2006/0285373 | A1 | * | 12/2006 | Archer ............................ 363/87 |
| 2007/0195560 | A1 | * | 8/2007  | Yasumura ................... 363/21.01 |
| 2008/0094862 | A1 | * | 4/2008  | Li et al. ........................ 363/21.12 |
| 2009/0129130 | A1 | * | 5/2009  | Young et al. .................... 363/84 |
| 2009/0141519 | A1 | * | 6/2009  | Hong et al. ..................... 363/17 |
| 2009/0257258 | A1 | * | 10/2009 | Ayukawa et al. ............... 363/89 |
| 2010/0067273 | A1 | * | 3/2010  | Chen ............................. 363/125 |
| 2010/0208501 | A1 | * | 8/2010  | Matan et al. .................... 363/95 |
| 2010/0238688 | A1 | * | 9/2010  | Samejima ................... 363/21.01 |
| 2011/0090716 | A1 | * | 4/2011  | Asuke et al. ................ 363/21.01 |
| 2011/0188270 | A1 | * | 8/2011  | Schmid et al. .............. 363/21.12 |
| 2011/0266969 | A1 | * | 11/2011 | Ludorf .......................... 315/294 |

* cited by examiner

Primary Examiner — Timothy J Dole
Assistant Examiner — Bryan R Perez

(57) ABSTRACT

A single switch PFC power supply (including forward and fly-back power supply) in single stage has two transformers: one forward transformer, one main transformer. The main transformer transfers electrical power from the primary circuit to secondary circuit. The forward transformer is used to correct input current waveform. The two transformer's primary windings are connected in series. An extra winding of the forward transformer, a capacitor and two diodes are formed a no loss snubber circuit to enhance the efficiency of the power supply.

17 Claims, 5 Drawing Sheets

HIGH EFFICIENT SINGLE SWITCH SINGLE STAGE POWER FACTOR CORRECTION POWER SUPPLY

The present invention relates to a power converter, and more particularly, to a high efficiency power factor correction (PFC) power converter in a single stage.

DESCRIPTION OF THE RELATED ART

Power converters have widely served to convert an unregulated power source to a regulated voltage or current. A PFC (Power Factor Correction) technique is applied to make an input current follow the waveform of an input voltage. Adding a PFC stage to the front end of a power converter substantially avoids unnecessary power loss and heat dissipation in a power contribution system.

Referring to FIG. 1, a power converter having two stages, according to prior art is illustrated. A first stage is PFC stage, which includes an inductor L1, a rectifier D1 and a transistor Q1 is driven by a PFC control signal from the PFC stage. A second stage includes a transistor Q2 controlled by a control signal PWM, a transformer T1 and secondary circuitry, thus output voltage is regulated and output ripple noise is reduced. However, the PFC stage configuration increases the cost and device counts of the converter, and hence the efficiency of power converter is reduced. Therefore, the development trend of a power converter is to build a single stage power converter with PFC function. The present invention provides a single stage PFC converter with no loss snubber circuit that reduces the cost and the size, i.e. device counts, and to improve the converter efficiency. The present invention can further provide a power converter operating in lower stress to obtain higher reliability.

SUMMARY OF THE INVENTION

The first objective of the present invention is to provide a switching power supply that operates from AC line voltage having a power factor correction and output isolation.

The second objective of this invention is to provide for a one stage power factor correction in an AC to DC converter.

The third objective of the present invention is to provide a simple circuit of PFC power supply to reduce the manufacture cost.

The fourth objective of the present invention is to provide a more efficient PFC power supply circuit.

The fifth objective of the present invention is to provide a snubber circuit without loss.

Further objects and advantages of this invention will be apparent from the following detailed description of a presently preferred embodiment, which is illustrated, schematically, in the accompanying drawings.

DESCRIPTION OF THE PREFERRED EMBODIMENT

Before explaining the disclosed embodiment of the present invention in detail, it is to be understood that the invention is not limited in its application to the details of the particular arrangement shown since the invention is capable of other embodiments.

The topology of the present invention is that a (PFC) forward transformer primary winding is connected in series to the main transformer's primary winding. The main transformer transfers power from the primary circuit to the secondary circuit unit. The forward transformer transfers power to its second winding of the forward transformer to correct the input current waveform. When the switch is off, the no loss snubber circuit stores the electrical energy in the capacitor; when the switch is on, it relieves the energy stored in the capacitor to the forward transformer.

Figure 1:
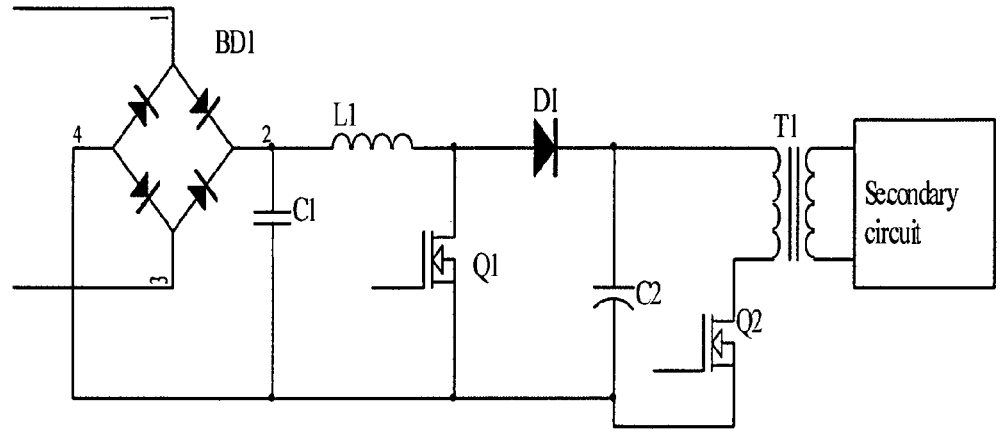
FIG. 1 is a schematic of the prior art, the two stage AC to DC converter.
Figure 2:
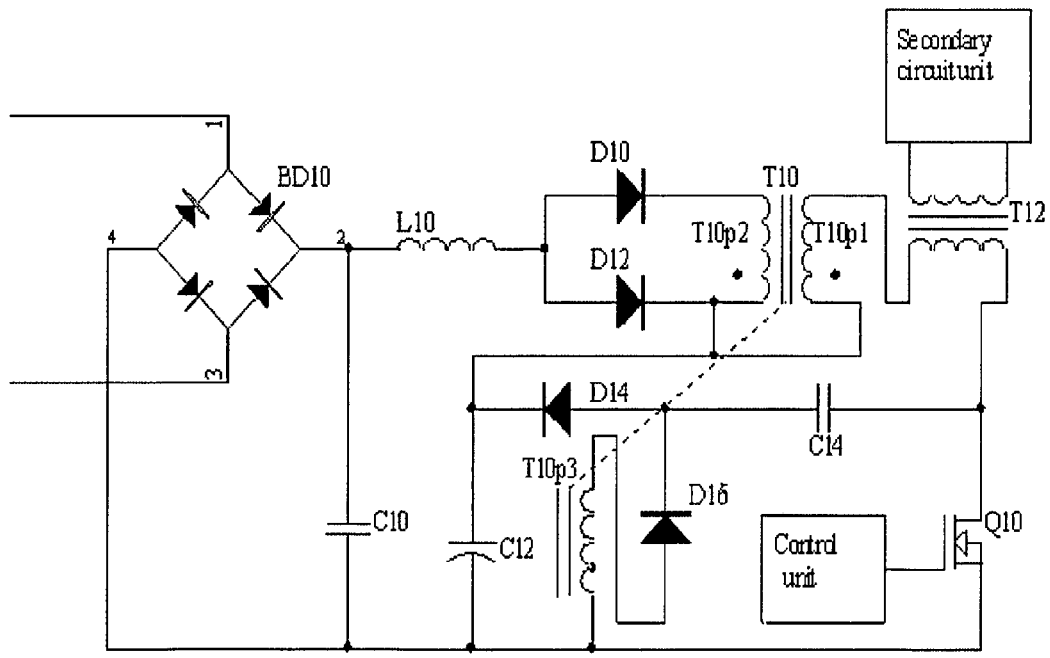
FIG. 2 is an embodiment of the present invention of the primary circuit of single switch power supply.

Refer to FIG. 2: The circuit diagram is a power factor correction for a single switch power supply unit. The arrangement is following:

A full bridge rectifier BD10 has output terminals (a positive terminal and a negative terminal), and input terminals which are coupled to AC power lines.

A first capacitor C10 is coupled to the output terminals of the full bridge rectifier BD10.

An inductor L10 has two terminals, the first terminal and the second terminal which is coupled to the positive output terminal of the full bridge rectifier BD10.

A first diode D10 has a cathode and an anode. The anode is coupled to the first terminal of the inductor L10.

A second diode D12 has a cathode and an anode which is coupled to the first terminal of the inductor L10.

A forward transformer T10 has three windings. The second winding T10p2 has a first terminal which is coupled to the cathode of the first diode D10 and a second terminal which is coupled to the cathode of the second diode D12. The first winding T10p1 has a first terminal and a second terminal which is coupled to the second terminal of the second winding. The third winding T10p3 has a first terminal and a second terminal which is coupled to the negative output of the full-bridge rectifier BD10; The second terminals of three windings have the same electrical polarity;

A second capacitor C12 has a positive terminal and a negative terminal, the positive terminal is coupled to the second terminal of the second winding T10p2 of the forward transformer T10 and the negative terminal is coupled to the negative output of the full bridge rectifier BD10.

A main transformer T12 has a primary winding and a secondary winding. The first terminal of the primary winding is coupled to the first terminal of the first winding T10p1 of the forward transformer T10. The secondary winding of the main transformer T12 is coupled to a secondary circuit unit. The main transformer is a forward transformer or a fly-back transformer.

A switch Q10 has three terminals, a first terminal, a second terminal and a control terminal. The first terminal is coupled to the second terminal of the primary winding of the main transformer T12. The second terminal is coupled to the negative output of the full bridge rectifier BD10. The control terminal is coupled to the control circuit unit which generates a PWM or PFM control signal.

A third capacitor C14 has a first terminal and a second terminal. The first terminal of the third capacitor C14 is coupled to the first terminal of the switch Q10.

A third diode D14 has an anode coupled to the second terminal of the third capacitor C14, and a cathode coupled to the positive terminal of the second capacitor.

A fourth diode D16 has an anode coupled to the second terminal of the third winding T10p3 of the forward transformer T10, and a cathode coupled to the second terminal of the third capacitor C14.

The operation of the FIG. 2 is following:

When switch Q10 is on, the third capacitor C14 discharges its electrical energy through the third winding T10p3 of the forward transformer T10 and the fourth diode D16; and a current conducts through the first winding T10p1 of the forward transformer T10, the primary winding of the main transformer T12 and the switch Q10; and at the same time there is an induced voltage in the second winding T10p2 of the forward transformer T10 and therefore there is a current drawn from the input to the second capacitor C12 (charging the second capacitor C12) through the inductor L10, the first diode D10 and the second winding T10p2 of the forward transformer T10.

When switch Q10 is off, the inductor L10 has an induced voltage and this induced voltage and the input voltage force a current charging the second capacitor C12 through the inductor L10 and the second diode D12. The energy, which is stored in the leakage inductances of the primary winding of the main transformer T12 and the first winding of the forward transformer T10, charges the third capacitor C14 through the third diode D14.

The number of the windings of the first winding T10p1 of the forward transformer T10 and the inductance value of the inductor L10 are adjusted to a certain value to correct the input current waveform in the best shape.

Figure 2A:
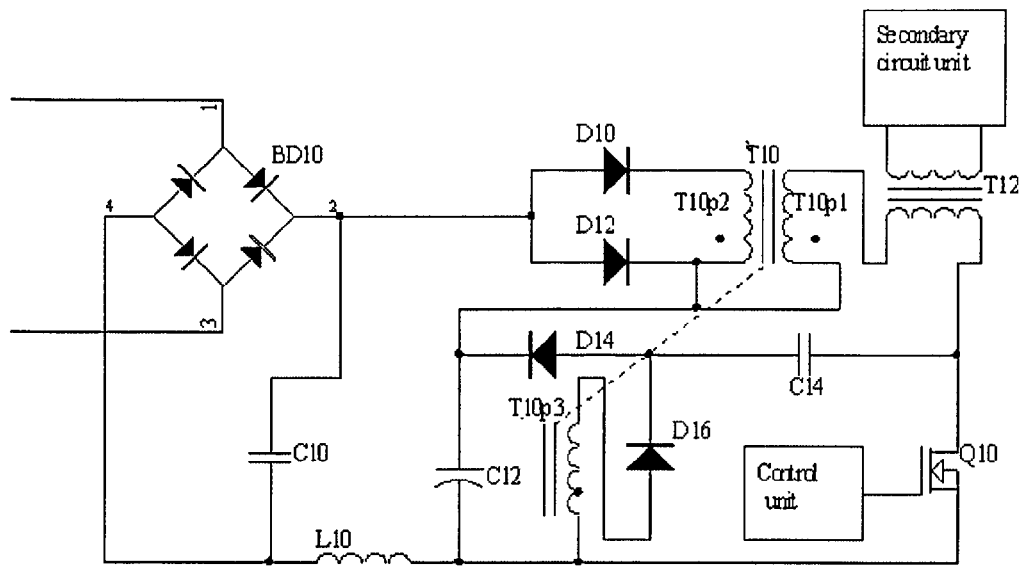
FIG. 2a is another arrangement of present invention of the PFC single switch power supply.
Figure 2B:
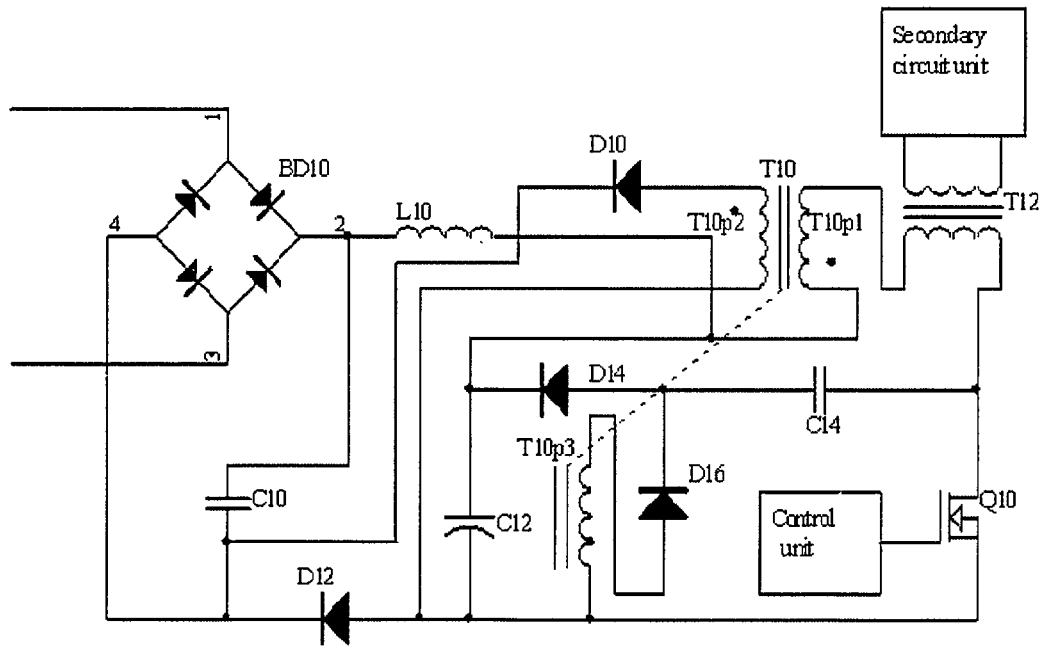
FIG. 2b is yet another arrangement of present invention of the PFC single switch power supply.

The circuit, which includes the second winding T10p2 of the forward transformer T10, the inductor D10, the second capacitor C12, the first diode D10 and the second diode D12, has numerous different arrangements to couple to the output terminals of the full bridge rectifier BD10. These arrangements have the same operating principle. For example, the circuit arrangements in FIG. 2a and FIG. 2b.

The snubber circuit, including the third winding T10p3 of the forward transformer T10, the third capacitor C14, the third diode D14 and fourth diode D16, recovers the energy which is stored in the leaking inductance of the main transformer T12 and the forward transformer T10 when the switch Q10 is off. The snubber circuit relieves the energy to the forward transformer T10 when the switch Q10 is on. The series connection of the third winding T10p3 and the fourth diode D16 is able to be inserted an inductor with small inductance value. The series circuit has different arrangements from the FIG. 2. By using this snubber circuit, the efficiency of the fly-back power supply is able to reach as high as 92% for 22v DC output.

Figure 3:
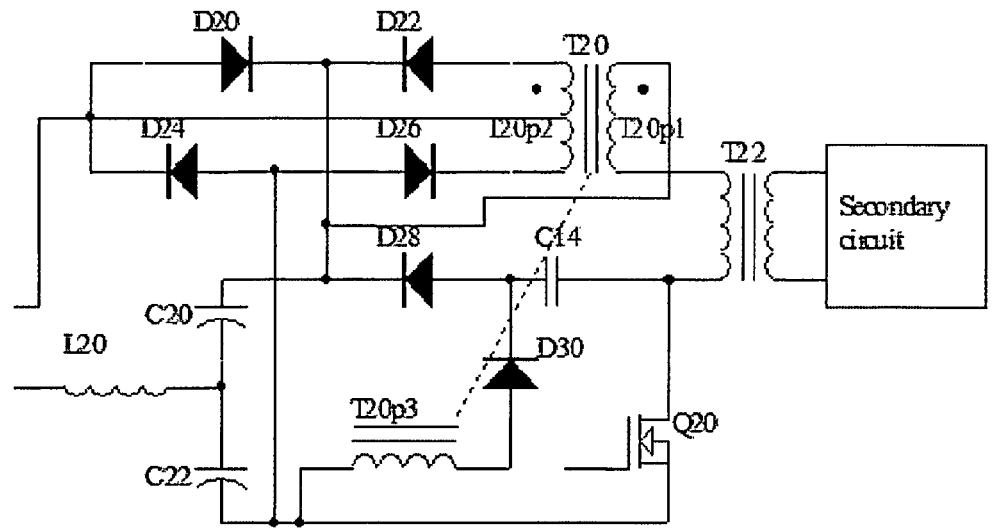
FIG. 3 is the present invention of the fly-back or forward power supply of the 120ν AC input.

For 110v AC power the circuit can be arranged as FIG. 3.

The inductor L20 has two terminals and the first terminal is connected to a first power line;

A first diode D20 has an anode and a cathode, the anode is coupled to the second power line.

A third diode D24 has an anode and a cathode, the cathode is coupled to the second power line.

A forward transformer T20 has three windings: a first winding T20p1, a second winding T20p2 and a third winding T20p3. The second winding T20p2 has a first terminal and a second terminal and a central tap which is coupled to the second power line. The first winding T20p1 has a first terminal and a second terminal. The third winding T20p3 has a first terminal and a second terminal. The first terminals of the three windings have the same electrical polarity.

A first capacitor C20 has a positive terminal and a negative terminal. The positive terminal is coupled to the cathode of the first diode D20. The negative terminal is coupled to the second terminal of the inductor L20.

A second capacitor C22 has a positive terminal and negative terminal, the positive terminal is coupled to the second terminal of the inductor L20 and the negative terminal is coupled to anode of third diode D24.

A second diode D22 has an anode and a cathode, the anode is coupled to the first terminal of the second winding T20p2 of the forward transformer T20 and the cathode is coupled to the positive terminal of the first capacitor C20 and the cathode of the first diode D20.

A fourth diode D26 has an anode and a cathode. The cathode of D26 is coupled to the second terminal of the second winding T20p2 of the forward transformer T20 and the anode of D26 is coupled to the negative terminal of the second capacitor C22.

A main transformer T22 has a primary winding and a secondary winding. The first terminal of the primary winding is coupled to the second terminal of the first winding T20p1 of the forward transformer T20. The secondary winding is coupled to secondary circuitry. The main transformer is a forward transformer or a fly-back transformer.

A switch Q20 has a first terminal, a second terminal and a control terminal. The first terminal of Q20 is coupled to the second terminal of the primary winding of the main transformer T20. The second terminal of Q20 is coupled to the negative terminal of the second capacitor C22.

A third capacitor C24 has a first terminal and a second terminal. The first terminal is coupled to the first terminal of the switch Q20.

A fifth diode D28 has an anode and a cathode, the anode is coupled to the second terminal of the third capacitor C24 and the cathode is coupled to the positive terminal of the first capacitor C20.

A sixth diode D30 has an anode and a cathode, the anode is coupled to the second terminal of the third winding T20p3 of the forward transformer T20 and the cathode is coupled to the second terminal of the third capacitor C24.

The operation of the FIG. 3 is following:

When the voltage of the second power line is higher than the voltage of the first power line and when the switch Q20 is switched on, the electrical energy in the third capacitor C24 is discharged through the third winding T20p3 of the forward transformer T20, the sixth diode D30 and the switch Q20; a current conducts through the first winding T20p1 of the forward transformer T20 and the primary winding of the main transformer T22 and the switch Q20; and at the same time there is an induced voltage in the second winding T20p2 of the forward transformer T20, therefore, there is a current drawn from the input to the second capacitor C20 (charging the second capacitor C20) through the inductor L20, the second diode D22 and the second winding T20p2 of the forward transformer T20. When switch Q20 is off, the inductor L20 has an induced voltage and this induced voltage and the input voltage force a current charging the second capacitor C20 to conduct through the inductor L20 and the first diode D20. The energy stored in the leakage inductances of the primary winding of the main transformer T22 and the first winding of the forward transformer T20 charges the third capacitor C24 through the fifth diode D28.

When the voltage of the second power line is lower than the voltage of the first power line and when the switch Q20 is switched on, the electrical energy in the third capacitor C24 is discharged through the third winding T20p3 of the forward transformer T20, the sixth diode D30 and the switch Q20; a current conducts through the first winding T20p1 of the forward transformer T20 and the primary winding of the main transformer T22 and the switch Q20; and at the same time there is an induced voltage in the second winding T20p2 of the forward transformer T20, therefore, there is a current drawn from the input to the second capacitor C22 (charging the second capacitor C22) through the inductor L20, the fourth diode D26 and the second winding T20p2 of the forward transformer T20*. When switch Q20 is off, the inductor L20 has an induced voltage and this induced voltage and the input voltage force a current charging the second capacitor C22 through the inductor L20 and the third diode D24. The energy which is stored in the leakage inductances of the primary winding of the main transformer T22 and the first winding of the forward transformer T20 charges the third capacitor C24 through the fifth diode D28.

Figure 3A:
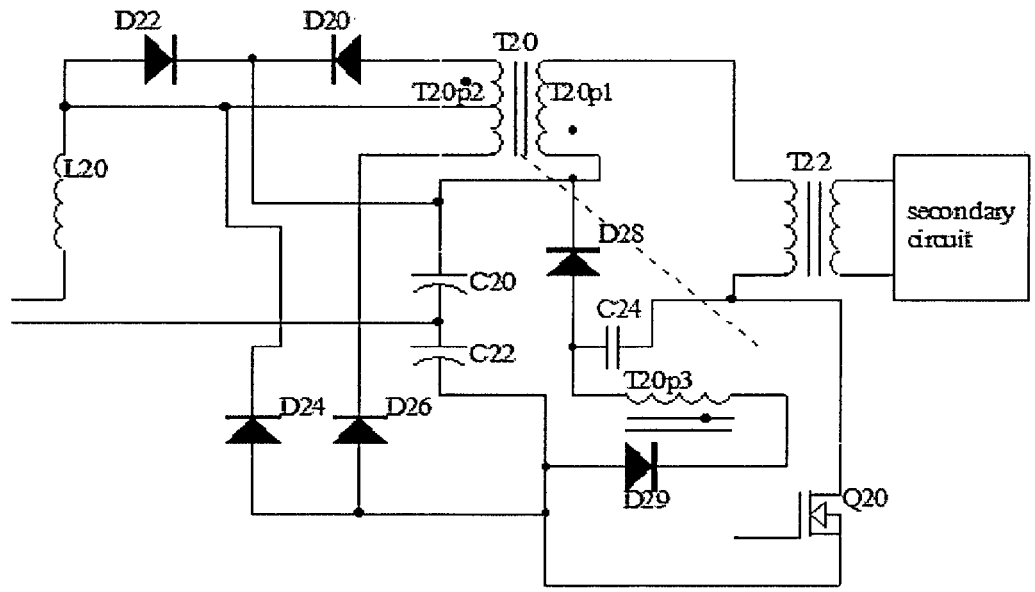
FIG. 3a is another arrangement of the present invention of the fly-back or forward power supply of the 120ν AC input.

The PFC circuit which includes the second winding T20p2 of the forward transformer, diodes D20, D22, D24, D26 and the inductor has other arrangements, for example, the circuit arrangement of FIG. 3a.

Figure 3B:
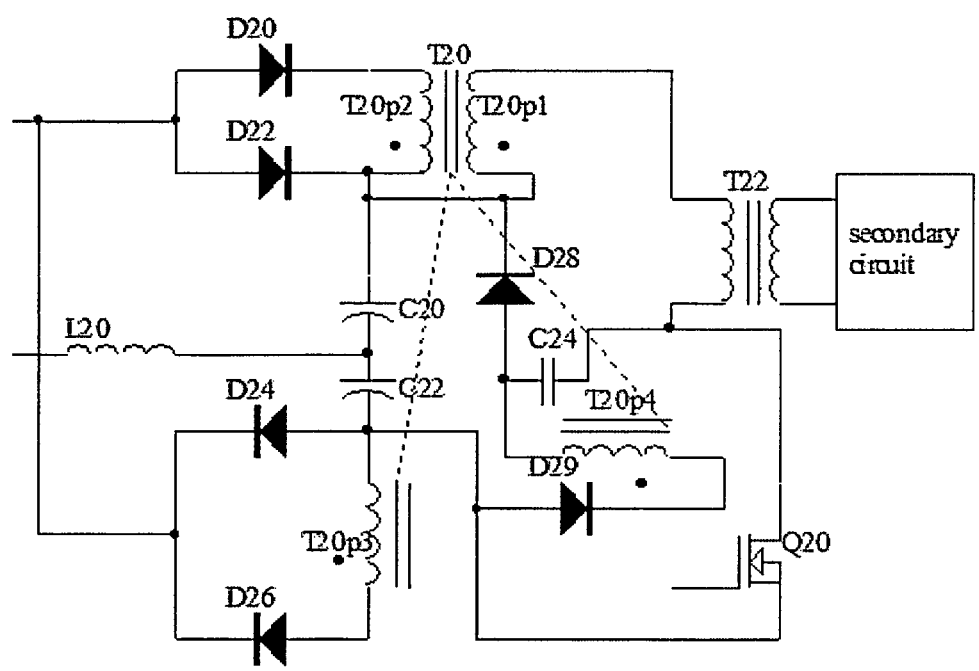
FIG. 3b is separated windings arrangement of the present invention of the fly-back or forward power supply of the 120ν AC input.

If the second winding is separated into two equal parts, T20p2 and T20p3, it can have another arrangement as FIG. 3b.

Figure 3C:
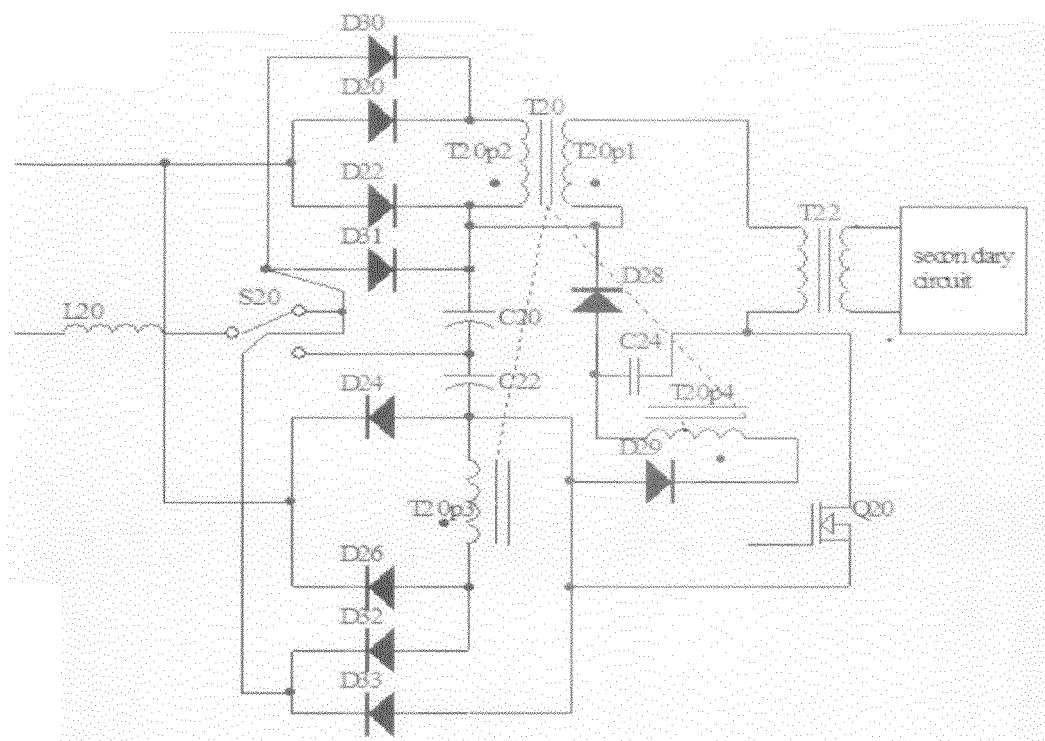
FIG. 3c is a circuit arrangement of 120 or 240 of the present invention of the fly-back or forward power supply.
Figure 4:
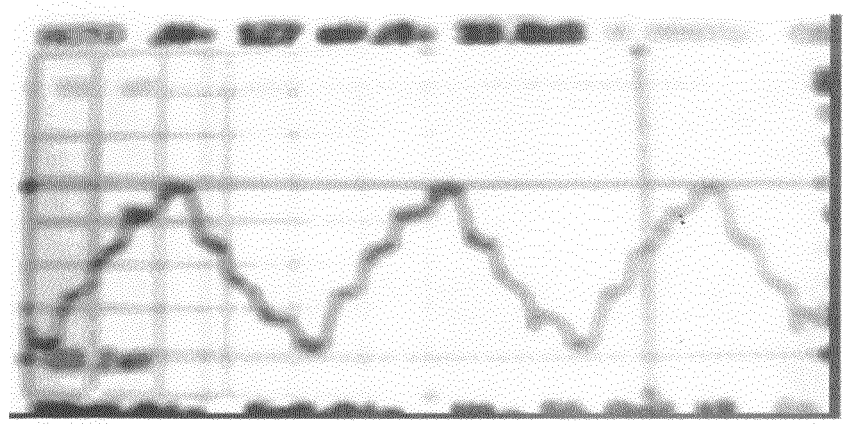
FIG. 4 is an input current waveform of 50w fly-back power supply.

If additional component 4 diodes, D30, D31, D32, D33, and a switch S20 are added to above diagram, it can have 120v or 240v single switch power supply depended on the switch S20 position as FIG. 3c.

What is claimed is:

1. A single stage PFC fly-back or forward power supply comprising:
    a full bridge rectifier having output terminals (a positive terminal and a negative terminal), and input terminals which are coupled to AC power lines;
    a first capacitor coupled to the output terminals of the full bridge rectifier;
    an inductor;
    a first diode;
    a second diode;
    a forward transformer having three windings: a first winding, a second winding and a third winding; the second winding of the forward transformer and the first diode being connected in series, then being connected in parallel to the second diode;
    a second capacitor having a positive terminal and a negative terminal which is connected to a terminal of the third winding of the forward transformer; the inductor, the second diode and the second capacitor being coupled in series and then being coupled to the output terminals of the full bridge rectifier; the second diode connected in parallel to the series circuit including the second winding of the forward transformer and the first diode; the anodes of the first diode and the second diode coupled toward the positive terminal of the second capacitor, and the anodes of these two diodes coupled toward the positive output of the full bridge rectifier; or the cathodes of these two diodes coupled toward the negative terminal of the second capacitor, and the cathodes of these two diodes coupled toward the negative terminal of the full bridge rectifier;
    a switch having three terminals: a first terminal, a second terminal which is connected to the negative terminal of the second capacitor, and a control terminal which is coupled to the control circuit unit that generates a PWM or a PFM control signal;
    a main transformer comprising:
    a primary winding;
    a secondary winding for being coupled to the secondary circuit unit;
    the primary winding of the main transformer connected to the first winding of the forward transformer in series, then this series circuit being connected between the first terminal of the switch and the positive terminal of the second capacitor; the main transformer which is a forward transformer or a fly-back transformer;
    a third capacitor having a first terminal which is connected to the first terminal of the switch, and a second terminal;
    a third diode having an anode which is connected to the second terminal of the third capacitor, and a cathode which is connected to the positive terminal of the second capacitor;
    a fourth diode having an anode which is connected to the other terminal of the third winding of the forward transformer, and a cathode which is connected to the second terminal of the third capacitor.

2. The single stage PFC fly-back or forward power supply in claim 1, wherein the first winding of the forward transformer is connected in series to the main transformer's primary winding, wherein the electrical energy, which is discharged from the second capacitor, through the first winding of the forward transformer is used to correct the input current waveform and wherein the electrical energy, which is discharged from the second capacitor, through the primary winding of the main transformer is transferred to the secondary circuit unit.

3. The single stage PFC fly-back or forward power supply in claim 2, wherein the main transformer is a forward transformer when the power supply employs a forward converter topology or a fly-back transformer when the power supply employs a fly-back converter topology.

4. The single stage PFC fly-back or forward power supply in claim 1, wherein the second winding of the forward transformer is used to draw the current from the input to the second capacitor, and wherein the circuit, which includes the second winding of the forward transformer, the first diode, the second diode, the second capacitor and the inductor, has multiple connection arrangements to couple to the output terminals of the full bridge rectifier and these arrangements have the same operating principle.

5. The single stage PFC fly-back or forward power supply in claim 4, wherein the inductor is a storage component and wherein when the switch is on, the inductor stores the electrical energy and when the switch is off, it relieves the energy through the second diode to the second capacitor.

6. The single stage PFC fly-back or forward power supply in claim 1, wherein the third diode, the fourth diode, the third capacitor and the third winding of the forward transformer form a no loss snubber circuit which is coupled between the second capacitor and the switch; and wherein when the switch is off, the no loss snubber circuit stores energy in the third capacitor and when the switch is on, it relieves the energy, which is stored in the third capacitor, to the third winding of the forward transformer through the fourth diode and the switch.

7. The single stage PFC fly-back or forward power supply in claim 6, wherein the fourth diode and the third winding of the forward transformer are used to discharge the third capacitor and to release the energy, which is stored in the forward transformer, to the second capacitor.

8. The single stage PFC fly-back or forward power supply in claim 1, wherein an integrated converter is the single stage PFC fly-back power supply, comprising: an input unit (the full bridge rectifier) for receiving an electric-power signal transmitted by a power source; an inductor for being electrically coupled to the input unit (the full bridge rectifier); a buck-boost converter (the main transformer and its secondary circuitry) comprising: a second (the main) transformer; a secondary circuit unit; a voltage regulator comprising: a first diode; a second diode; and a first transformer (the forward transformer) comprising: a primary (the first) winding for being electrically coupled to the buck-boot converter, and a second winding for being electrically coupled to the first diode and the second diode, wherein the voltage regulator is electrically coupled to the inductor through the first diode and the second diode, and is electrically coupled to the converter through the first (the forward) transformer; an energy-storing (the second) capacitor for being electrically coupled to the voltage regulator; a single-ended switch for being electrically coupled to the second (main) transformer; a control unit, which generates a signal (PWM), for being electrically coupled to the single-ended switch so as to optionally alter the electromotive force of the first (the forward) transformer of the voltage regulator and further switch on the first diode or the second diode alternatively.

9. The single stage PFC fly-back power supply in claim 8, wherein the primary winding of the second (main) transformer in the buck-boost converter is electrically coupled to the primary (first winding of the first (forward) transformer in the voltage regulator.

10. The single stage PFC fly-back power supply in claim 8, wherein the second winding of the first (forward) transformer, the first diode, the second diode and the inductor form a power factor correction circuit.

11. The single stage PFC fly-back power supply in claim 8, wherein the inductor is a storage component which stores electrical energy when the switch in the converter is on and releases electrical energy when the switch in the converter is off.

12. A 120v AC single stage PFC fly-back or forward power supply comprising:
an inductor having a first terminal which is connected to a first power line, and a second terminal;
a first diode having an anode which is connected to the second power line, and a cathode;
a third diode having an anode and a cathode which is connected to the second power line;
a forward transformer having three windings: a first winding, a second winding and a third winding; the first winding having a first terminal and a second terminal; the second winding having a first terminal, a second terminal and a central tap which is connected to the second power line; the third winding having a first terminal and a second terminal; the first terminals of the three windings having the same electrical polarity;
a first capacitor having a positive terminal which is connected to the cathode of the first diode, and a negative terminal which is connected to the second terminal of the inductor;
a second capacitor having a positive terminal which is connected to the second terminal, of the inductor, and a negative terminal which is connected to the anode of the third diode;
a second diode having an anode which is connected to the first terminal of the second winding of the forward transformer, and a cathode which is connected to the positive terminal of the first capacitor;
a fourth diode having an anode which is connected to the negative terminal of the second capacitor, and a cathode which is connected to the second terminal of the second winding of the forward transformer;
a main transformer having a primary winding and a secondary winding; the primary winding having a first terminal which is connected to the second terminal of the first winding of the forward transformer, and a second terminal;
the secondary winding which is coupled to secondary circuitry; the main transformer which is a forward transformer or a fly-back transformer;
a switch having a first terminal which is connected to the second terminal of the primary winding of the main transformer, a second terminal which is connected to the negative terminal of the second capacitor, and a control terminal;
a third capacitor having a first terminal which is connected to the first terminal of the switch, and a second terminal;
a fifth diode having an anode which is connected to the second terminal of the third capacitor, and a cathode which is connected to the positive terminal of the first capacitor;
a sixth diode having an anode which is connected to the second terminal of the third winding of the forward transformer, and a cathode which is connected to the second terminal of the third capacitor.

13. A 120v single stage PFC fly-back or forward power supply in claim 12, wherein the first winding of the forward transformer is connected in series to the primary winding of the main transformer; the energy which discharges from the first capacitor and the second capacitor, through the first winding of the forward transformer is used to correct the input current waveform; the energy which discharges from the first capacitor and the second capacitor, through the primary winding of the main transformer is transferred to the secondary circuitry.

14. The 120v single stage PFC fly-back or forward power supply in claim 12, wherein the inductor is used to reduce the input current amplitude and when the switch is on, the inductor stores energy; when the switch is off, it relieves energy to the first capacitor and the second capacitor.

15. The 120v single stage PFC fly-back or forward power supply in claim 12, wherein the first diode, the second diode, the third diode, the fourth diode, the second winding of the forward transformer and the inductor form a rectified power factor correction circuit.

16. The 120v single stage PFC fly-back or forward power supply in claim 12, wherein the fifth diode, the sixth diode, the third capacitor and the third winding of the forward transformer form a no-loss snubber circuit which is coupled between the first capacitor and the switch; wherein when the switch is off, the no-loss snubber circuit stores energy in the third capacitor and when the switch is on, it relieves energy from the third capacitor to the forward transformer through the third winding of the forward transformer.

17. The 120v single stage PFC fly-back or forward power supply in claim 16, wherein the third winding of the forward transformer and the sixth diode are connected in series to discharge the third capacitor.

\* \* \* \* \*